FILING RACK OR STORAGE DEVICES

Filed Sept. 20, 1961 4 Sheets-Sheet 1

INVENTOR.
DAVID MEADE PEEBLES
BY B. P. Fishburne, Jr.
ATTORNEY

FILING RACK OR STORAGE DEVICES

Filed Sept. 20, 1961 4 Sheets-Sheet 2

INVENTOR.
DAVID MEADE PEEBLES

BY B. P. Fishburne, Jr.
ATTORNEY

FILING RACK OR STORAGE DEVICES

Filed Sept. 20, 1961 4 Sheets-Sheet 3

INVENTOR.
DAVID MEADE PEEBLES
BY
B. P. Fishburne, Jr.
ATTORNEY

April 6, 1965 D. M. PEEBLES 3,176,849

FILING RACK OR STORAGE DEVICES

Filed Sept. 20, 1961 4 Sheets-Sheet 4

INVENTOR.
DAVID MEADE PEEBLES

BY

B. P. Fishburne, Jr.

ATTORNEY

United States Patent Office 3,176,849
Patented Apr. 6, 1965

3,176,849
FILING RACK OR STORAGE DEVICES
David Meade Peebles, 2912 Courtland Place NW.,
Washington, D.C.
Filed Sept. 20, 1961, Ser. No. 139,433
1 Claim. (Cl. 211—50)

This invention relates to filing devices.

An object of the invention is to provide an inexpensive rugged and durable filing rack or device for business files or other like material, and adapted to serve as a desk file or as a file storage means in conjunction with a suitable storage box, tray or file cabinet drawer.

Another important object is to provide a filing device of the mentioned character which may accommodate papers and files of the so-called letter-size and/or legal-size.

Still another object is to provide a filing device of the mentioned character which utilizes a substantially unitary wire type rack body portion, together with novel tray or base means which serve to stabilize the rack body portion and to also aid in the proper positioning of files and papers placed in the device.

Another object is to provide a filing rack having novel and simplified handle means integral therewith to facilitate lifting the same and base or tray means which may be permanently or detachably secured to the body portion of the rack.

A further object is to provide filing means of the above-mentioned character which is highly economical to manufacture, easy to assemble and which is compact to facilitate shipment and storage thereof.

Other objects and advantages of the invention will be apparent during the course of the following detailed description.

Figures 1, 2, 3:
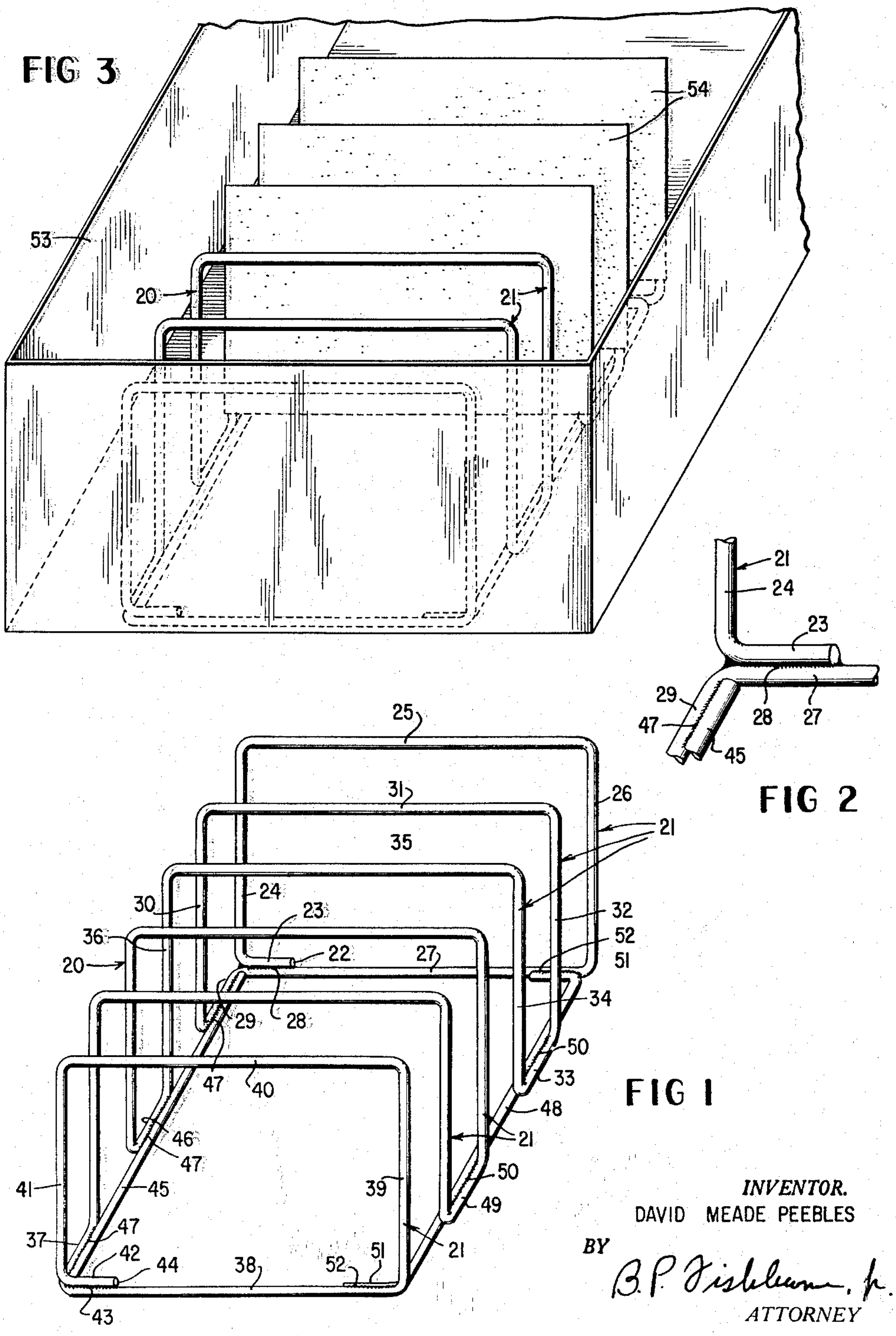
Figures 4, 8:
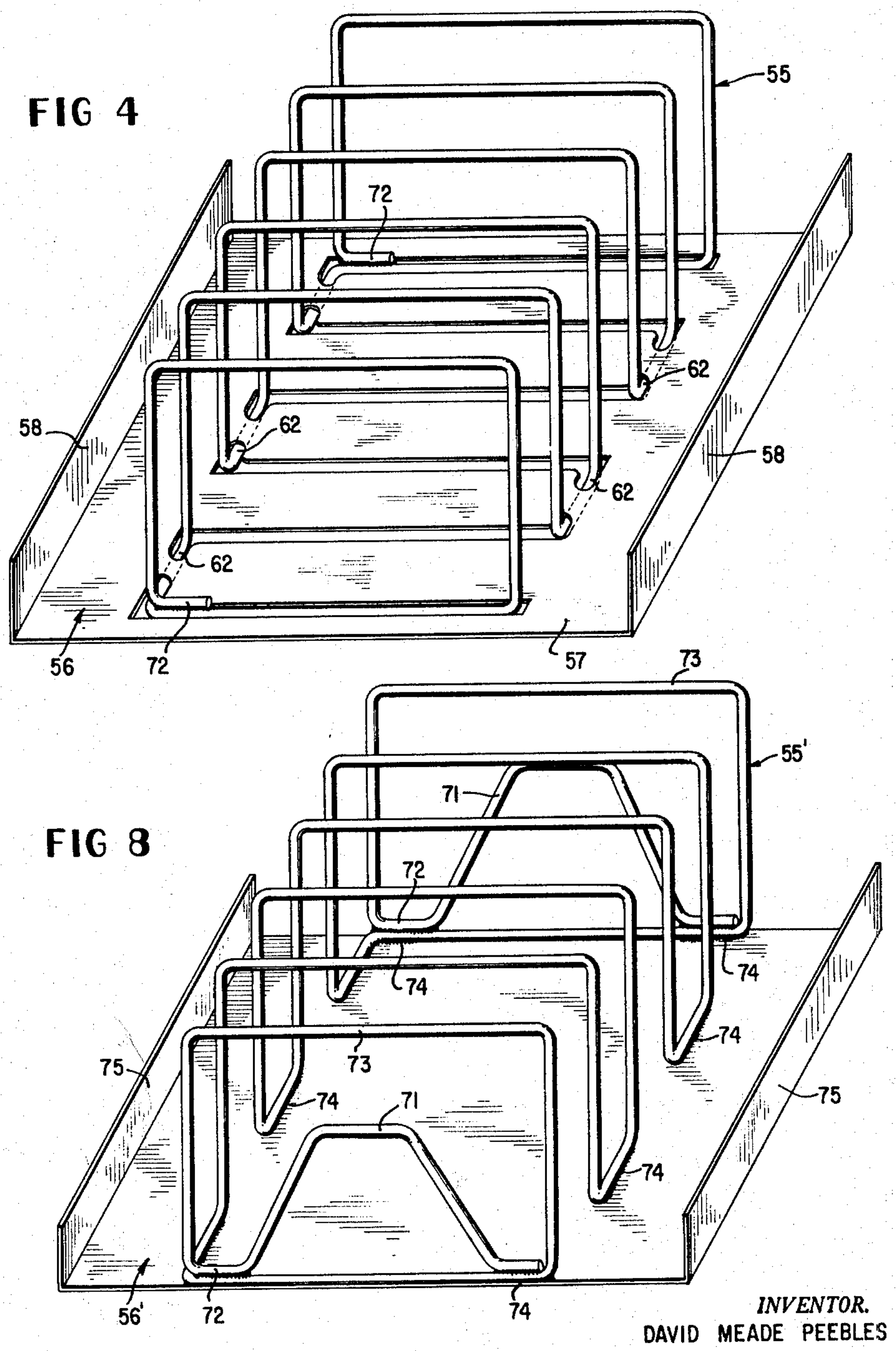
Figure 5:
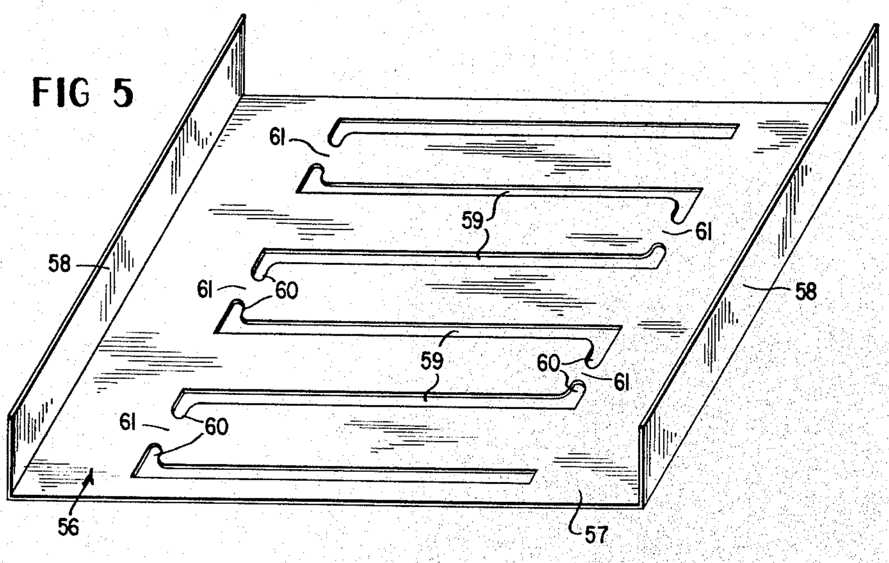
Figure 6:
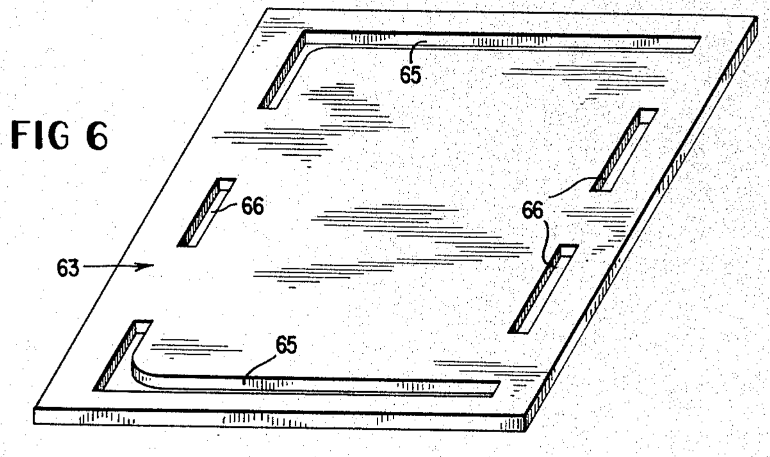
Figure 7:
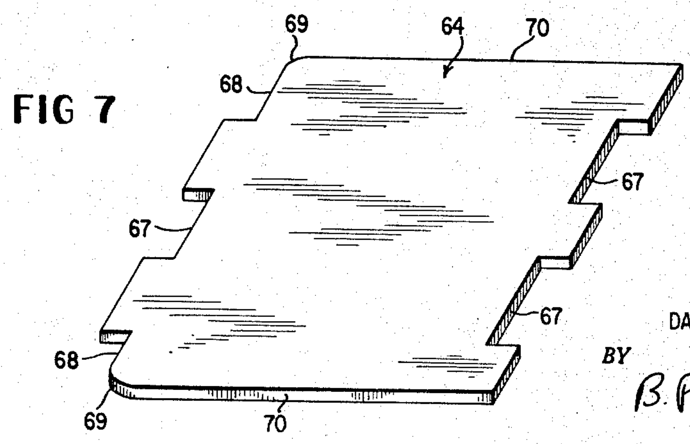
Figure 8A:
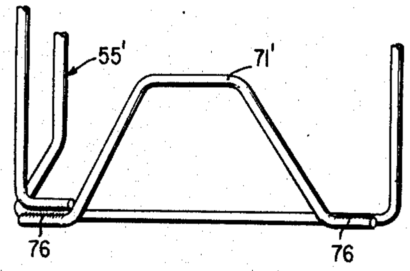
Figure 9:
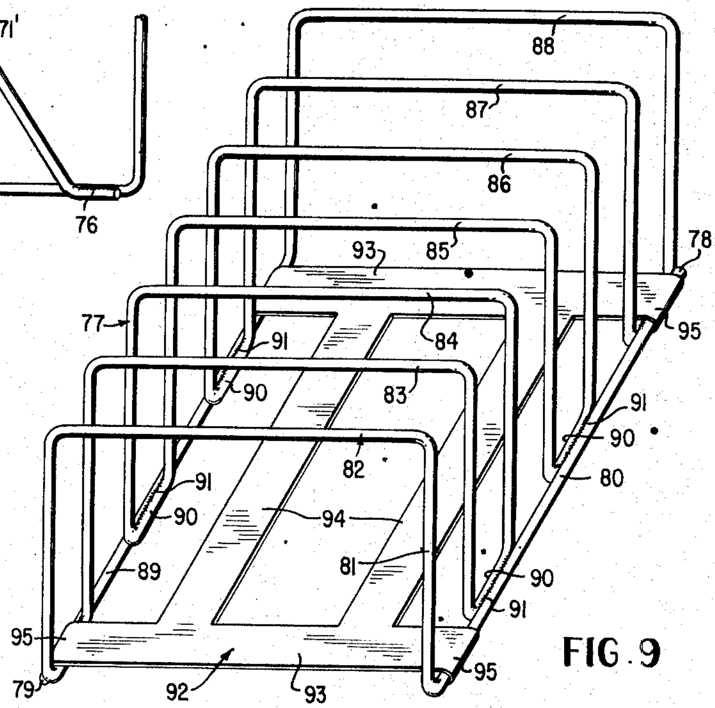
Figure 10:
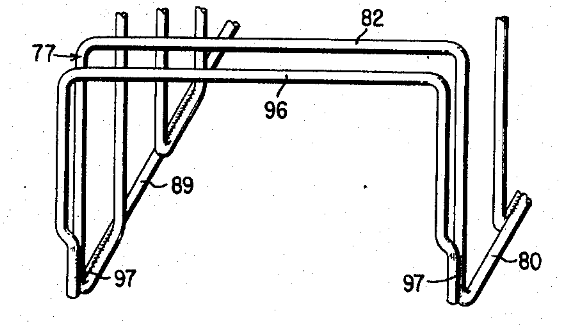
Figure 12:
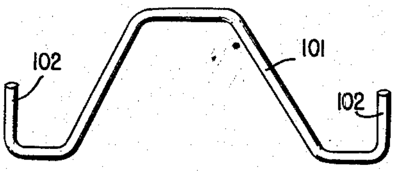
Figure 13:
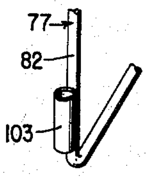
Figure 11:
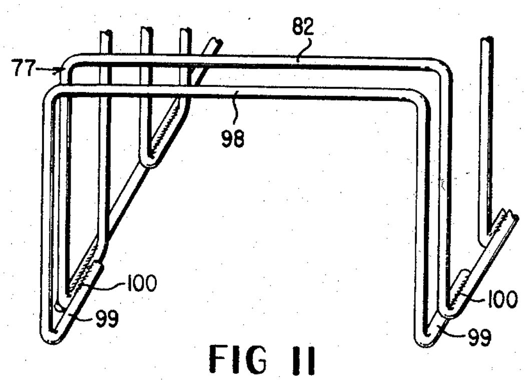

In the accompanying drawings forming a part of this application and in which like numerals are employed to designate like parts throughout the same, FIGURE 1 is a perspective view of a filing device or rack according to one preferred embodiment of the invention, FIGURE 2 is an enlarged fragmentary perspective view illustrating in detail the construction of one corner portion of the device or rack shown in FIGURE 1, FIGURE 3 is a further fragmentary perspective view of the filing rack placed within a storage box or drawer and having applied thereto index partition means, parts omitted, FIGURE 4 is a perspective view of a filing device or rack including a tray member according to a modification of the invention, FIGURE 5 is a perspective view of the tray member shown in FIGURE 4, FIGURES 6 and 7 are perspective views of modified bases or tray members for use in conjunction with the rack body portion shown in FIGURE 4, FIGURE 8 is a further perspective view of a filing device according to another modification of the invention and including a permanently attached tray member and integral handle means, FIGURE 8*a* is a fragmentary perspective view of a filing rack having a separately applied handle means, FIGURE 9 is a perspective view of another modified form of filing rack including base stabilizing means, the rack being formed so as to be readily nestable with similar racks, FIGURE 10 is a fragmentary perspective view of one end portion of the rack shown in FIGURE 9 with a lifting handle means applied thereto, FIGURE 11 is a similar view showing a modified form of lifting handle means, FIGURE 12 is a perspective view of a further modified form of lifting handle, FIGURE 13 is a fragmentary perspective view of socket means for the handle shown in FIGURE 12.

In the drawings, wherein for the purpose of illustration are shown preferred embodiments of the invention, attention is directed first to FIGURES 1–3 of the drawings, wherein the numeral 20 designates broadly a filing device or rack of substantially unitary construction and formed entirely of relatively stiff yet somewhat resilient material, such as metal wire, wire formed of plastics material, plastic-impregnated Fiberglas or the like.

The rack 20 comprises a plurality of preferably equidistantly spaced upright parallel loops or frames 21 which are preferably rectangular and preferably of equal height and width and formed from a continuous uninterrupted length of wire or the like. The section of wire which is formed to provide the several loops 21 has a first end 22 adjacent a short horizontal section 23 which is directed upwardly at 24 and further formed as at 25 and 26 to provide the first or endmost loop 21, FIGURE 1. The first loop 21 has a bottom horizontal transverse section 27 which underlies the short section 23 and is preferably rigidly secured thereto by welding or the like at 28. From this point, the continuous wire section is bent to provide a short longitudinal portion 29 directed upwardly at 30 and horizontally and transversely at 31 and downwardly vertically at 32 to form the next successive loop or frame 21 of the filing rack. The continuous wire section extends longitudinally and horizontally at 33 for a distance preferably equal to the length of the portion 29 and then upwardly at 34 and transversely horizontally at 35 and downwardly at 36 to form the next or third upstanding loop 21 of the rack. In like manner, as clearly shown in FIGURE 1, the next two intermediate loops 21 of the device are constructed from the continuous wire section making up the body portion of the filing device 20. The continuous length of wire is finally directed longitudinally and horizontally at 37 for a distance equal to the elements 29 and 33 and then horizontally transversely at 38 and upwardly at 39 and then horizontally at 40 in the reverse direction and downwardly at 41 and then inwardly horizontally for a short distance at 42 to complete the formation of the other endmost integral loop 21 of the rack. The short transverse section 42 is preferably welded at 43 to the top of lower transverse portion 38, the second end of the unitary wire section being shown at 44, longitudinally opposite to the first end 22. The lower horizontal portions 27, 29, 33, 37, 38, etc. are all disposed at the same elevation or in the same horizontal plane and the two short sections 23 and 42 are preferably directly above the underlying transverse elements 27 and 38. The several upstanding rectangular loops 21 thus formed provide storage compartments for files or the like between adjacent pairs thereof.

To strengthen and stabilize the bottom of the rack 20, there is provided at one side thereof and directly inwardly of the portions 29 and 37 a straight longitudinal horizontal rod 45 which spans the entire length of the rack between the elements 27 and 38. This reinforcing rod or wire 45 is disposed at the same elevation as the sections 29 and 37 and the like intermediate section 46 and is preferably welded thereto as at 47 and may also have its ends welded to the elements 27 and 38. If preferred, the rod 45 may be applied to the outer sides of the sections 29, 37 and 46, but the preferable arrangement is shown in FIGURE 1.

In a similar manner, a second bottom longitudinal reinforcing rod 48 is applied to the opposite side of the rack inwardly of the section 33 and the like section 49 and welded thereto at 50 and disposed at the elevation of the sections 33 and 49. The rod 48 preferably has short inwardly directed transverse ends 51 integral therewith arranged adjacent the inner sides of elements 27 and 38 and welded thereto at 52. The rod 48 may, if desired, be mounted upon the outer sides of the wire sections 33 and 49, but the preferred construction is shown in FIGURE 1.

The filing rack 20 constructed in the manner shown by FIGURE 1 may be employed to file any desired material upon a table or desk and the rack 20 possesses wide utility in and of itself as above-described.

To further enhance its utility as illustrated in FIGURE 3, the rack 20 may be placed within a file cabinet drawer 53, file storage box or the like with proper clearance beyond the sides of the rack to accommodate legal size papers or files. If desired, bottom opening envelope-like index partitions 54 of manila paper, sheet plastics material or the like may be removably telescoped over any or all of the upstanding loops 21 to more clearly differentiate the plurality of filing compartments, and the elements 54 may bear visible index or filing indicia near the tops thereof. The overall height of the rack 20 may be made such that the use of the rack within a cabinet drawer equipped with the well-known suspension filing means will not interfere with the concurrent use of such means in the drawer.

With reference to FIGURES 4 through 7, related modifications of the invention are illustrated, wherein the wire or like body portion of the rack has a base or tray member associated therewith either detachably or permanently.

With particular reference to FIGURE 4, a wire rack 55 is illustrated, which rack may be identical to the rack 20 except that the bottom reinforcing rods 45 and 48 are omitted from the construction. In view of this, it is unnecessary to repeat the detailed description of the wire rack 55 shown in FIGURE 4.

A preferably sheet metal base or tray member 56, FIGURES 4 and 5, is provided for use with the modified rack 55 to stabilize the same upon a desk or table or within a drawer or box as preferred. The tray member 56 has a flat horizontal rectangular base wall 57 and upstanding relatively shallow longitudinal side flanges 58 extending for its entire length and disposed at right angles to the base wall 57 and spaced apart a sufficient distance to accommodate legal files therebetween. The tray member 56 has its base wall slotted in the manner shown in detail in FIGURE 5 to facilitate assembling the tray member over the top of the wire rack 55 detachably. The several elongated transverse slots 59 shown in FIGURE 5 are adapted to accommodate the several upstanding loops of the rack 55 when assembly takes place, and the short transverse slot portions 60 shown in the drawings are provided to accommodate the bottom portions of the rack 55 which are formed with radii. In assembly, the intermediate bridging areas 61, FIGURE 5, between the slot portions 60 may rest directly upon the bottom longitudinal sections 62 of the rack 55, and the bridging areas 61 may, if preferred, be struck upwardly from the plane of the base wall 57 so that the latter may rest flat upon a table or the like after assembly over the rack 55. If preferred, the areas 61 may remain flat and in the same plane as the base wall 57, and it is expected in this connection that the gage of the wire utilized for the rack 55 may be thin enough so that an entirely flat base wall 57 may be employed satisfactorily without the necessity for upwardly striking the small areas 61. This is an optional feature of the construction as should now be apparent. If desired, the assemblage of elements shown in FIGURE 4 may be rendered permanent by merely tack welding the tray member 56 to the rack 55 at the areas 61 and other points at the bottom of the rack.

In FIGURES 6 and 7, modified forms of detachable or permanent base members 63 and 64 for the rack 55 are illustrated. These members are plate-like and flat, as shown, and they may be formed of Masonite or other suitable stiff material. The base member 63 is rectangular and is of a size approximating the area of the base wall 57, FIGURE 4, without the flanges 58. The base member 63 has a pair of L-shaped slots 65 formed therethrough near and inwardly of its opposite ends and relatively short longitudinal slots 66 are provided as shown near and inwardly of the longitudinal edges of the base member. The rack 55 is applied downwardly to the base member 63, and the bottom portions 62, FIGURE 4, enter the slots 66, while the end and corner bottom portions of the rack 55 are received snugly in assembly within the L-shaped slot 66. The mentioned portions of the rack 55 preferably have a snug or pressed fit within the several slots 65 and 66 of base member 63 and the bottom of the rack 55 may be assembled flush with the bottom face of the member 63. If preferred, the member 63 may be thin sheet metal similar to tray member 56 and the portions 62, etc. of rack 55 may be tack welded within the slots of the metal base member. It is contemplated, however, in the preferred arrangement that the Masonite or like base member 63 be detachably connected with the wire or like rack 55.

In FIGURE 7, the modified smaller base member 64 of Masonite or the like is notched at 67 in its longitudinal edges and recessed on one side as at 68 and provided with a pair of rounded corners 69. The same rack 55 is applied downwardly over the base member 64 and the elements 62 are received within the notches 67 and the recesses 68, and the rounded corners 69 and transverse edges 70 of the base member 64 receive the endmost bottom transverse portions of the rack closely adjacent thereto, the bottom of the rack being flush in assembly with the bottom face of the member 64. The parts are preferably readily detachable but may be permanently assembled as above explained if desired. The base member 64, FIGURE 7, does not provide a tray portion projecting beyond the confines of the rack 55.

In FIGURE 8, a further modification of the invention is illustrated, wherein a rack 55' is permanently assembled by welding or the like to a base or tray member 56'. The base member 56' may be identical to the base member 56 except that the slots shown in FIGURE 5 are all omitted. The rack 55' may be identical to the rack 55, FIGURE 4, except that end upstanding lifting handles 71 are formed integral with the rack 55' by extending the short end portions 72 shown in FIGURE 4 and shaping the continuous wire to provide the handles 71 integral therewith. The handles 71 are preferably upwardly divergent somewhat from the end loops 73 of the rack 55' to facilitate lifting the device. The rack 55' may be welded to the base member 56' as at 74 and like points. The arrangement shown in FIGURE 8 provides a permanently assembled filing rack of inexpensive and relatively lightweight construction for use upon a desk or within a storage box or cabinet drawer, and the rack may accommodate letter-size and/or legal-size files and has flanges 75 to prevent endwise displacement of the files.

In FIGURE 8*a*, there is shown a slight modification of the device illustrated in FIGURE 8, wherein the handles 71' are formed from separate wire sections and attached to the ends of the rack 55' by welding or the like at 76. All other parts are identical to the construction shown in FIGURE 8.

FIGURE 9 shows a still further modification of the filing device or rack, including a wire rack body portion 77 formed from a continuous section of wire in the manner clearly illustrated. The continuous wire for the body portion 77 has ends 78 and 79; the wire section is extended longitudinally at 80 from the end 78 to form a bottom horizontal reinforcing rod which rod is directed upwardly at 81 to provide a first loop or frame 82 of the wire rack 77. The subsequent loops 83, 84, 85, 86, 87 and 88 are successively formed from the continuous wire section in substantially the same manner above-described for prior forms of the invention, and the opposite endmost loop 88 has its lower end extended longitudinally at 89 to provide a second bottom horizontal reinforcing rod for the wire rack, FIGURE 9. The lower longitudinal connecting portions 90 of the several loops 82–88 are secured by welding or the like at 91 to the rods 80 and 89 and lying in the same plane as these rods.

The several loops 82–88, FIGURE 9, are each preferably successively wider between the rods 80 and 89 to facilitate nesting the rack body portions 77 during shipment or storage. However, if preferred, the loops 82–88 may all be the same size and the feature of nestability is optional.

There is preferably provided in FIGURE 9 a stabilizing and strengthening skeleton base 92 formed of thin sheet metal or the like and including end transverse strips 93 and integral longitudinal strips 94 as shown. The opposite ends of the strips 93 are rolled or clipped over the rods 80 and 89 to complete the assembly as indicated at 95. The base 92 may be detached from the rack body portion 77 by merely flexing the lower longitudinal sides of the rack body portion inwardly to separate the same from the clips 95 which are channel-like in construction and inwardly opening. If preferred, the clips 95 may be permanently clinched about the rods 80 and 89 to provide a permanent assembly. The rack shown in FIGURE 9 may serve as a desk rack for files or may be used advantageously within a storage box or file cabinet drawer.

FIGURE 10 shows a slight modification of the rack body portion 77 in FIGURE 9, where opposite ends of the same are provided with outwardly offset upstanding U-shaped lifting handles 96, formed of separate sections of wire and preferably welded to the rack body portion 77 as at 97. The base 92 has been omitted in FIGURE 10 for the purpose of simplification of illustration.

FIGURE 11 shows a slight modification of the lifting handles, wherein the inverted U-shaped handle 98 is spaced outwardly from the endmost loop 82 of rack body portion 77 by bottom spacer extensions 99, welded to the rack body portion at 100.

FIGURE 12 and FIGURE 13 show a further handle modification wherein the separately formed handle 101, FIGURE 12, has upstanding end extensions 102, detachably engageable within sleeve sockets 103 disposed vertically and welded to the upstanding sides of the endmost loops or frames of the wire rack body portion 77.

It is to be understood that the forms of the invention herewith shown and described are to be taken as preferred examples of the same, and that various changes in the shape, size and arrangement of parts may be resorted to, without departing from the spirit of the invention or the scope of the subjoined claim.

Having thus described my invention, I claim:

A rack having a body portion formed from a single piece of wire, said wire having a first end and extending longitudinally therefrom to form a first elongated reinforcing rod on the body portion at the bottom and at one side thereof, said wire having a second end on the opposite side of the body portion and diagonally opposite the first end, said wire extending longitudinally from the second end to form a second elongated reinforcing rod on the body portion at the bottom and other side thereof approximately parallel to and coextensive lengthwise with said first reinforcing rod, said wire being directed vertically upwardly from diagonally opposite ends of the reinforcing rods and then transversely horizontally across the body portion in opposite directions and downwardly vertically to form on the body portion an end pair of inverted U-shaped loops, each loop having one leg integral with one of said reinforcing rods, short longitudinal bottom connecting portions on the other legs of the end pair of loops extending in opposite directions longitudinally and disposed at the inner side of the first and second reinforcing rods and welded thereto near diagonally opposite corners of the body portion, a plurality of intermediate inverted U-shaped loops and integral bottom longitudinal connecting portions formed from said wire between said end pair of loops, all of said connecting portions welded to said reinforcing rods at the inner sides thereof, said connecting portions on one side of the rack staggered longitudinally from the connecting portions on the other side thereof, and a sheet material base member for the rack body portion lying substantially in a common plane with said reinforcing rods and connecting portions, said base member including transverse end strips having their ends terminating in rolled clips, said clips embracing said reinforcing rods immediately inwardly of said end pair of loops.

References Cited by the Examiner

UNITED STATES PATENTS

| | | | |
|---|---|---|---|
| 386,674 | 7/88 | Wells | 211—11 |
| 451,729 | 5/91 | Dom | 211—11 |
| 1,360,192 | 11/20 | Davidson | 211—41 |
| 1,621,465 | 3/27 | Hammes | 211—11 X |
| 2,642,861 | 6/53 | Tvedt | 129—16 |
| 2,885,085 | 5/59 | Chamerlin | 211—10 |
| 3,032,203 | 5/62 | Romero | 211—41 |

FOREIGN PATENTS

| | | | |
|---|---|---|---|
| 1,175,211 | 11/58 | France. | |

L. WILLIAM VARNER, *Primary Examiner.*

JEROME SCHNALL, *Examiner.*